(12) United States Patent
Jones

(10) Patent No.: US 8,795,508 B2
(45) Date of Patent: Aug. 5, 2014

(54) CARBON DIOXIDE SEQUESTRATION THROUGH FORMATION OF GROUP-2 CARBONATES AND SILICON DIOXIDE

(75) Inventor: Joe David Jones, Austin, TX (US)

(73) Assignee: Skyonic Corporation, Austin, TX (US)

(*) Notice: Subject to any disclaimer, the term of this patent is extended or adjusted under 35 U.S.C. 154(b) by 564 days.

(21) Appl. No.: 12/972,006

(22) Filed: Dec. 17, 2010

(65) Prior Publication Data

US 2011/0203939 A1 Aug. 25, 2011

Related U.S. Application Data

(60) Provisional application No. 61/288,242, filed on Dec. 18, 2009.

(51) Int. Cl.
C25B 1/16 (2006.01)
C25B 1/34 (2006.01)

(52) U.S. Cl.
USPC ........... 205/510; 205/514; 205/517; 423/158; 423/165

(58) Field of Classification Search
USPC .................. 205/510, 514, 517; 423/158, 165
See application file for complete search history.

(56) References Cited

U.S. PATENT DOCUMENTS

| | | | |
|---|---|---|---|
| 2,383,674 A | 8/1945 | Osborne | 422/423 |
| 3,801,698 A | 4/1974 | Lowrance et al. | 423/234 |
| 3,855,398 A | 12/1974 | Hoffman et al. | 423/422 |
| 3,864,236 A * | 2/1975 | Lindstrom | 204/265 |
| 4,032,616 A | 6/1977 | Artur et al. | 423/190 |
| 4,069,117 A | 1/1978 | Cooper | 423/220 |
| 4,128,701 A | 12/1978 | Maricle | 429/21 |
| 4,147,599 A | 4/1979 | O'Leary et al. | 204/187 |
| 4,496,452 A * | 1/1985 | Bianchi | 204/266 |
| 4,620,969 A | 11/1986 | Wilkinson | 423/421 |
| 4,720,375 A | 1/1988 | Ainscow et al. | 423/175 |
| 4,749,453 A | 6/1988 | Harris | 204/98 |
| 4,764,286 A | 8/1988 | Bon et al. | 210/757 |
| 5,080,799 A | 1/1992 | Yan | 210/661 |
| 5,888,256 A | 3/1999 | Morrison | 44/552 |
| 6,340,736 B1 | 1/2002 | Coenen et al. | 528/196 |
| 6,488,740 B1 | 12/2002 | Patel et al. | 95/71 |
| 6,592,829 B2 | 7/2003 | Chakravarti et al. | 422/171 |
| 6,676,824 B2 | 1/2004 | Urquhart et al. | 205/504 |
| 6,846,584 B2 | 1/2005 | Dutil et al. | 429/19 |
| 6,890,497 B2 | 5/2005 | Rau et al. | 423/220 |
| 6,896,865 B2 | 5/2005 | Kumoi et al. | 423/488 |

(Continued)

FOREIGN PATENT DOCUMENTS

| | | |
|---|---|---|
| DE | 19631794 | 8/1997 |
| EP | 2070578 | 6/2009 |

(Continued)

OTHER PUBLICATIONS

Li et al. Electrolysis and heat pretreatment methods to promote CO2 sequestration by mineral carbonation, 2009 Chemical Engineering Research and Design 87 pp. 210-215.*

(Continued)

Primary Examiner — Arun S Phasge
(74) Attorney, Agent, or Firm — Fulbright & Jaworski LLP

(57) ABSTRACT

The present invention relates to carbon dioxide sequestration, including processes in which group-2 silicates are used to remove carbon dioxide from waste streams to form corresponding group-2 carbonates and silica.

27 Claims, 2 Drawing Sheets

(56) References Cited

U.S. PATENT DOCUMENTS

| | | | |
|---|---|---|---|
| 6,908,570 B2 | 6/2005 | Green | 252/182.32 |
| 6,958,136 B2 | 10/2005 | Chandran et al. | 423/239.1 |
| 7,361,279 B2 | 4/2008 | Hernandez et al. | 210/668 |
| 7,427,449 B2 | 9/2008 | Delaney et al. | 423/419.1 |
| 7,517,435 B2 | 4/2009 | Guth et al. | 203/47 |
| 7,527,770 B2 | 5/2009 | Monzyk et al. | 422/186.3 |
| 7,655,069 B2 | 2/2010 | Wright et al. | 95/92 |
| 7,655,193 B1 | 2/2010 | Rau et al. | 422/169 |
| 7,699,909 B2 | 4/2010 | Lackner et al. | 95/236 |
| 7,708,806 B2 | 5/2010 | Wright et al. | 95/139 |
| 7,727,374 B2 | 6/2010 | Jones | 205/508 |
| 7,735,274 B2 | 6/2010 | Constantz et al. | 106/735 |
| 7,744,761 B2 | 6/2010 | Constantz et al. | 210/652 |
| 7,749,476 B2 | 7/2010 | Constantz et al. | 106/668 |
| 7,754,169 B2 | 7/2010 | Constantz et al. | 106/465 |
| 7,833,328 B2 | 11/2010 | Lackner et al. | 96/281 |
| 7,875,163 B2 | 1/2011 | Gilliam et al. | 205/210 |
| 7,887,694 B2 | 2/2011 | Constantz et al. | 423/230 |
| 7,909,911 B2 | 3/2011 | Lackner et al. | 95/51 |
| 7,931,809 B2 | 4/2011 | Constantz et al. | 210/652 |
| 7,993,432 B2 | 8/2011 | Wright et al. | 95/139 |
| 7,993,500 B2 | 8/2011 | Gilliam et al. | 204/263 |
| 8,062,418 B2 | 11/2011 | Constantz et al. | 106/738 |
| 8,114,214 B2 | 2/2012 | Constantz et al. | 106/738 |
| 8,137,444 B2 | 3/2012 | Farsad et al. | 96/235 |
| 8,137,455 B1 | 3/2012 | Constantz et al. | 106/738 |
| 8,177,909 B2 | 5/2012 | Constantz et al. | 106/738 |
| 2002/0129450 A1 | 9/2002 | Kim | 8/115 |
| 2004/0051080 A1 | 3/2004 | Ernst et al. | 423/438 |
| 2004/0089841 A1 | 5/2004 | Green | 252/182.32 |
| 2004/0096384 A1 | 5/2004 | Echigo et al. | 423/247 |
| 2004/0178149 A1 | 9/2004 | Hernandez et al. | 210/688 |
| 2004/0213705 A1 | 10/2004 | Blencoe et al. | 422/129 |
| 2004/0219090 A1 | 11/2004 | Dziedzic et al. | 423/437.1 |
| 2004/0265202 A1 | 12/2004 | Chandran et al. | 423/239.1 |
| 2005/0002847 A1 | 1/2005 | Maroto-Valer et al. | 423/437.1 |
| 2005/0011770 A1 | 1/2005 | Katsuyoshi et al. | 205/742 |
| 2005/0013750 A1 | 1/2005 | Monzyk et al. | 422/186.3 |
| 2005/0031522 A1 | 2/2005 | Delaney et al. | 423/419.1 |
| 2006/0051274 A1 | 3/2006 | Wright et al. | 423/220 |
| 2006/0076228 A1 | 4/2006 | Guth et al. | 203/47 |
| 2006/0185985 A1 | 8/2006 | Jones | 205/508 |
| 2006/0186562 A1 | 8/2006 | Wright et al. | 261/94 |
| 2006/0289003 A1 | 12/2006 | Lackner et al. | 128/200.24 |
| 2007/0187247 A1 | 8/2007 | Lackner et al. | 204/518 |
| 2008/0031801 A1 | 2/2008 | Lackner et al. | 423/438 |
| 2008/0087165 A1 | 4/2008 | Wright et al. | 95/51 |
| 2008/0138265 A1 | 6/2008 | Lackner et al. | 423/224 |
| 2008/0245660 A1 | 10/2008 | Little et al. | 204/242 |
| 2008/0245665 A1 | 10/2008 | Little et al. | 205/555 |
| 2008/0248350 A1 | 10/2008 | Little et al. | 429/21 |
| 2009/0001020 A1 | 1/2009 | Constantz et al. | 210/652 |
| 2009/0010827 A1 | 1/2009 | Geerlings et al. | 423/164 |
| 2009/0020044 A1 | 1/2009 | Constantz et al. | 106/738 |
| 2009/0074656 A1 | 3/2009 | Billings | 423/648.1 |
| 2009/0081096 A1 | 3/2009 | Pellegrin | 423/232 |
| 2009/0101008 A1 | 4/2009 | Lackner et al. | 423/224 |
| 2009/0101050 A1 | 4/2009 | Lackner et al. | 110/216 |
| 2009/0120288 A1 | 5/2009 | Lackner et al. | 95/268 |
| 2009/0127127 A1 | 5/2009 | Jones | 205/464 |
| 2009/0169452 A1 | 7/2009 | Constantz et al. | 423/230 |
| 2009/0202413 A1 | 8/2009 | Saxena | 423/277 |
| 2009/0232861 A1 | 9/2009 | Wright et al. | 424/405 |
| 2009/0294366 A1 | 12/2009 | Wright et al. | 210/683 |
| 2009/0301352 A1 | 12/2009 | Constantz et al. | 106/668 |
| 2009/0320688 A1 | 12/2009 | Lackner et al. | 96/257 |
| 2010/0051859 A1 | 3/2010 | House et al. | 252/182.32 |
| 2010/0092368 A1 | 4/2010 | Neumann et al. | 423/437.1 |
| 2010/0095842 A1 | 4/2010 | Lackner et al. | 95/107 |
| 2010/0105126 A1 | 4/2010 | Wright et al. | 435/257.1 |
| 2010/0116137 A1 | 5/2010 | Wright et al. | 95/150 |
| 2010/0202937 A1 | 8/2010 | Lackner et al. | 422/187 |
| 2011/0027142 A1 | 2/2011 | Wright et al. | 422/187 |
| 2011/0027143 A1 | 2/2011 | Wright et al. | 422/187 |
| 2011/0027157 A1 | 2/2011 | Wright et al. | 423/230 |
| 2011/0033357 A1 | 2/2011 | Wright et al. | 423/230 |
| 2011/0033358 A1 | 2/2011 | Wright et al. | 423/230 |
| 2011/0056382 A1 | 3/2011 | Lackner et al. | 96/329 |
| 2011/0079144 A1 | 4/2011 | Wright et al. | 95/54 |
| 2011/0079146 A1 | 4/2011 | Wright et al. | 95/92 |
| 2011/0079147 A1 | 4/2011 | Wright et al. | 95/92 |
| 2011/0079149 A1 | 4/2011 | Wright et al. | 96/143 |
| 2011/0079150 A1 | 4/2011 | Wright et al. | 96/143 |
| 2011/0081709 A1 | 4/2011 | Wright et al. | 435/257.1 |
| 2011/0081710 A1 | 4/2011 | Wright et al. | 435/257.1 |
| 2011/0081712 A1 | 4/2011 | Wright et al. | 435/296.1 |
| 2011/0083554 A1 | 4/2011 | Wright et al. | 95/92 |
| 2011/0091955 A1 | 4/2011 | Constantz et al. | 435/168 |
| 2011/0135551 A1 | 6/2011 | House et al. | 423/234 |

FOREIGN PATENT DOCUMENTS

| | | |
|---|---|---|
| GB | 2460910 | 6/2010 |
| GE | 1999-1612 | 4/1999 |
| GE | 2001-2514 | 8/2001 |
| GE | 2004-3357 | 10/2004 |
| JP | 51-023499 | 2/1976 |
| JP | 52085997 | 7/1977 |
| JP | 61-048587 | 3/1986 |
| JP | 10-001307 | 1/1998 |
| JP | 2004174369 | 6/2004 |
| RU | 2 019 271 | 9/1994 |
| RU | 2 031 695 | 3/1995 |
| RU | 2054959 | 2/1996 |
| RU | 2199374 | 2/2003 |
| RU | 2233898 | 8/2004 |
| RU | 2334547 | 8/2005 |
| WO | WO 2004/037391 | 5/2004 |
| WO | WO 2005/108291 | 11/2005 |
| WO | WO 2005/108297 | 11/2005 |
| WO | WO 2006/009600 | 1/2006 |
| WO | WO 2006/023743 | 3/2006 |
| WO | WO 2006/034339 | 3/2006 |
| WO | WO 2006/036396 | 4/2006 |
| WO | WO 2006/084008 | 8/2006 |
| WO | WO 2006/113673 | 10/2006 |
| WO | WO 2007/016271 | 2/2007 |
| WO | WO 2007/018558 | 2/2007 |
| WO | WO 2007/003013 | 11/2007 |
| WO | WO 2008/018928 | 2/2008 |
| WO | WO 2008/042919 | 4/2008 |
| WO | WO 2008/061210 | 5/2008 |
| WO | WO 2008/124538 | 10/2008 |
| WO | WO 2008/131132 | 10/2008 |
| WO | WO 2009/039445 | 3/2009 |
| WO | WO 2009/061836 | 5/2009 |
| WO | WO 2009/086460 | 7/2009 |
| WO | WO 2009/102816 | 8/2009 |
| WO | WO 2009/105566 | 8/2009 |
| WO | WO 2009/146436 | 12/2009 |
| WO | WO 2009/149292 | 12/2009 |
| WO | WO 2010/019600 | 2/2010 |
| WO | WO 2010/022399 | 2/2010 |
| WO | WO 2010/132395 | 11/2010 |
| WO | WO 2011/011740 | 1/2011 |

OTHER PUBLICATIONS

Search Report issued in Eurasian Patent Application No. 201290528, dated Mar. 18, 2013.

PCT International Preliminary Report on Patentability issued in International application No. PCT/US2010/061111, dated Jun. 28, 2012.

Air and Gas Duct Structural Design Committee of the Energy Division of the Air and Gas Structural Design Committee. *The Structural Design of Air and Gas Ducts for Power Stations and Industrial Boiler Application*. Ronald L. Schneider, chmn. New York, NY: ASCE Publications, Aug. 1, 1995. pp. 11-15.

Cadmium Chloride, Material Safety Data Sheet, CAS No. 7790-78-5, ESPI Metals, available on the internet at http://www.espimetals.com/index.php/msds/460-cadmium-chloride. Revised/Verified Sep. 2005. Accessed Dec. 28, 2011.

(56) References Cited

OTHER PUBLICATIONS

Calcium Nitrate Tetrahydrate, Material Safety Data Sheet, CAS No. 13477-34-4, available on the internet at http://avogadro.chem.iastate.edu/MSDS/Ca%28NO3%292-4H2O.htm. MSDS Creation Date: Jan. 21, 1998. Revision #4 Date: Oct. 3, 2005. Accessed Dec. 28, 2011.
Cobalt Iodide, Material Safety Data Sheet, CAS No. 45238-00-3, ESPI Metals, available on the internet at http://www.espimetals.com/index.php/msds/527-cobalt-iodide. Revised/Verified Dec. 2004. Accessed Dec. 28, 2011.
Cobalt(II) Sulfate Heptahydrate, Material Safety Data Sheet, CAS No. 10026-24-1, Chemical Book, available on the internet at http://www.chemicalbook.com/ProductMSDSDetailCB0323842_EN.htm. Copyright 2008. Accessed Dec. 28, 2011.
Kirsh et al., "Kinetic analysis of thermal dehydration and hydrolysis of MgCl12.6H2O by DTA and TG," *Journal of Thermal Analysis*, 32:393-408, 1987.
Lithium Bromide, Material Safety Data Sheet, CAS No. 7550-35-8, ChemCas, available on the internet at http://www.chemcas.com/material/cas/archive/7550-35-8_v1.asp. Material Safety Data Sheet Creation Date: Jun. 29, 1999. Revision #3 Date: Mar. 18, 2003. Accessed Dec. 28, 2011.
Magnesium Nitrate Hexahydrate, Material Safety Data Sheet, CAS No. 13446-18-9, available on the internet at http://avogadro.chem.iastate.edu/MSDS/MgNO3-6H2O.htm. Material Safety Data Sheet Creation Date: Sep. 2, 1997. Revision #6 Date: Aug. 11, 2004. Accessed Dec. 28, 2011.
Manganese (II) Chloride Tetrahydrate, Material Safety Data Sheet, CAS No. 13446-34-9, available on the internet at http://avogadro.chem.iastate.edu/MSDS/MnCl2.htm. Material Safety Data Sheet Creation Date: Dec. 12, 1997. Revision #2 Date: Mar. 18, 2003. Accessed Dec. 28, 2011.
Office Action in Georgian Patent Application AP 2008 011762 dated Sep. 30, 2011 (English translation included).
Office Communication issued in Australian Patent Application No. 2005286729, dated Sep. 27, 2010.
Office Communication issued in Australian Patent Application No. 2010212414, dated Mar. 28, 2011.
Office Communication issued in Australian Patent Application No. 2010212413, dated Mar. 25, 2011.
Office Communication issued in Chinese Patent Application No. 200580038754.5, dated May 4, 2011. (English translation).
Office Communication issued in European Patent Application No. 05799708.2, dated Jan. 20, 2011.
Office Communication issued in European Patent Application No. 08831664.1-2113, dated Sep. 10, 2009.
Office Communication issued in Georgian Patent Application No. AP 2005 009999, dated Jul. 26, 2010. (English translation).
Office Communication issued in Georgian Patent Application No. AP 2005 009999, dated Jan. 8, 2009. (English translation).
Office Communication issued in Korean Patent Application No. 10-2007-7009233, dated Nov. 1, 2010. (English Translation).
Office Communication issued in Taiwanese Patent Application No. 09413312, dated Dec. 15, 2010 (English translation).
Office Communication issued in U.S. Appl. No. 12/235,482, dated Sep. 3, 2010.
Office Communication issued in U.S. Appl. No. 12/235,482, dated Mar. 31, 2011.
Office Communication issued in U.S. Appl. No. 12/790,121, dated Oct. 28, 2010.
Office Communication issued in U.S. Appl. No. 12/790,121, dated Sep. 2, 2011.
Office Communication issued in U.S. Appl. No. 11/233,509, dated Oct. 2, 2009.
Office Communication issued in U.S. Appl. No. 11/233,509, dated May 27, 2009.
Office Communication issued in U.S. Appl. No. 11/233,509, dated Dec. 24, 2008.
Office Communication issued in U.S. Appl. No. 11/233,509, dated Sep. 4, 2008.
Office Communication issued in Georgian Patent Application No. AP 2005 009999, dated Sep. 28, 2011. (English translation).
PCT International Preliminary Report on Patentability issued in International Application No. PCT/US2008/077122, dated Apr. 1, 2010.
PCT International Search Report and Written Opinion issued in International Application No. PCT/US2010/061111, dated Feb. 18, 2011.
PCT International Search Report and Written Opinion issued in International Application No. PCT/US11/43470, dated Dec. 6, 2011.
PCT International Search Report issued in International Application No. PCT/US2008/077122, dated Oct. 30, 2009.
Shore et al., "V.F.1—Platinum Group Metal Recycling Technology Development," Department of Energy Hydrogen Program, United States. Department of Energy Fiscal Year 2008 Annual Progress Report, pp. 35-938. Published Nov. 2008. Available on the internet at http://www.hydrogen.energy.gov/pdfs/progress08/v_f_1_shore.pdf. Accessed Dec. 28, 2011.
Sodium Iodide, Material Safety Data Sheet, CAS No. 7681-82-5, Chemical Book, available on the internet at http://www.chemicalbook.com/ProductMSDSDetailCB6170714_EN.htm. Copyright 2008. Accessed Dec. 28, 2011.
U.S. Appl. No. 61/370,030 entitled "Carbon Dioxide Sequestration Involving Energy-Efficient Conversion of Group 2 Chlorides to Group 2 Hydroxides," by Joe David Jones and Al Yablonsky, filed Aug. 2, 2010.
U.S. Appl. No. 61/406,536 entitled "Carbon Dioxide Sequestration Involving Energy-Efficient Conversion of Group 2 Chlorides to Group 2 Hydroxides," by Joe David Jones and Al Yablonsky, filed Oct. 25, 2010.
U.S. Appl. No. 61/451,078 entitled "Carbon Dioxide Sequestration Involving Energy-Efficient Conversion of Group 2 Chlorides to Group 2 Hydroxides," by Joe David Jones and Al Yablonsky, filed Mar. 9, 2011.
"Skyonic Corporation presents the SkyMine Process—A proprietary technology that removes carbon dioxide ($CO_2$) and other flue gas pollutants—converting same into non-toxic, commercial chemicals," Presentation given to President's Council of Advisors on Science and Technology by Joe Jones and Steve Goldstein, on Sep. 20, 2005.
Goldberg et al., "CO2 mineral sequestration studies in US," *Proceedings of First National Conference on Carbon Sequestration*, 14-17 May 2001, Washington, DC., section 6c, United States Department of Energy, National Energy Technology Laboratory. available at: http://www.netl.doe.gov/publications/proceedings/01/carbon_seq/6c1 . pdf.
Kirk-Othmer Encyclopedia of Chemical Technology, $4^{th}$ ed. vol. 15 p. 343, 1998, New York: John Wiley and Sons.
Office Communication, issued in Australian Patent Application No. 2005286729, dated Mar. 5, 2010.
Office Communication, issued in Chinese Patent Application No. 20050038754.5, dated Jun. 2, 2010. (English translation).
Office Communication, issued in Chinese Patent Application No. 20050038754.5, dated Nov. 21, 2008. (English translation).
Office Communication, issued in Chinese Patent Application No. 20050038754.5, dated Oct. 30, 2009. (English translation).
Office Communication, issued in Japanese Patent Application No. 2007-533607, dated Oct. 6, 2010 (English translation included).
Office Communication, issued in Russian Patent Application No. 2007115051, dated Sep. 18, 2009. (English translation).
Office Communication, issued in Russian Patent Application No. 2007115051, dated Apr. 1, 2010. (English translation).
PCT International Search Report and Written Opinion, issued in International Application No. PCT/US2005/033814, dated Feb. 15, 2006.
PCT Invitation to Pay Additional Fees issued in PCT International Application No. PCT/US2008-077122, dated Mar. 4, 2009.
*Proceedings of First National Conference on Carbon Sequestration*, May 14-17, 2001, Washington, DC. United States Department of Energy, National Energy Technology Laboratory. CD-ROM USDOE/NETL-2001/1144; also available at http://www.netl.doe.gov/publications/proceedings/01/carbon_seq/carbon_seq01.html.

(56) References Cited

OTHER PUBLICATIONS

Search Report, issued by Georgian National Center of Intellectual Property "SAK:ATENT", issued in Georgian Application No. AP 2005 009999, dated Jan. 8, 2010. (English Translation).
U.S. Appl. No. 60/612,355 entitled "Removing Carbon Dioxide From Waste Streams Through Co-Generation of Synthetic Carbonate Minerals ," by Joe David Jones, filed Sep. 23, 2004.
U.S. Appl. No. 60/642,698 entitled "Removing Carbon Dioxide From Waste Streams Through Co-Generation of Synthetic Carbonate Minerals ," by Joe David Jones, Jan. 10, 2005.
U.S. Appl. No. 60/718,906 entitled "Removing Carbon Dioxide From Waste Streams Through Co-Generation of Synthetic Carbonate Minerals ," by Joe David Jones , filed Sep. 20, 2005.
U.S. Appl. No. 60/973,948 entitled "Removing Carbon Dioxide From Waste Streams Through Co-Generation of Carbonate and/or Bicarbonate Minerals," by Joe David Jones, filed Sep. 20, 2007.
U.S. Appl. No. 61/032,802 entitled "Removing Carbon Dioxide From Waste Streams Through Co-Generation of Carbonate and/or Bicarbonate Minerals ," by Joe David Jones, filed Feb. 29, 2008.
U.S. Appl. No. 61/033,298 entitled "Removing Carbon Dioxide From Waste Streams Through Co-Generation of Carbonate and/or Bicarbonate Minerals," by Joe David Jones, filed Mar. 3, 2008.
U.S. Appl. No. 61/288,242 entitled "Carbon Dioxide Sequestration Through Formation of Group-2 Carbonates and Silicon Dioxide", by Joe David Jones, filed Dec. 18, 2009.
U.S. Appl. No. 61/362,607 entitled "Carbon Dioxide Sequestration Involving Energy-Efficient Conversion of Group 2 Chlorides to Group 2 Hydroxides," by Joe David Jones, filed Jul. 8, 2010.
Kelley, "Energy requirements and equilibria in the dehydration, hydrolysis, and decomposition of magnesium chloride", Technical Paper 676, United States Government Printing Office, pp. 1-26, 1945.
Pulvirenti et al., Acid generation upon thermal concentration of natural water: The critical water content and the effects of ionic composition, *Journal of Contaminant Hydrology*, 109:62/81, 2009.
Lackner et al., "Magnesite disposal of carbon dioxide," submitted to $22^{nd}$ International Technical Conference on Coal Utilization and Fuel System, Clearwater, Florida, Mar. 16-19, 1997.
Wei, Xinchao, "Technological evaluation of mineral sequestration of $CO_2$ by carbonation," Thesis submitted to College of Engineering and Mineral Resources at West Virginia University in partial fulfillment of the requirements for the degree of Master of Science in Mining Engineering, 2003.
Daval, D, et al., "Carbonation of Ca-bearing Silicates, The Case of Wollastonite: Experimental Investigations and Kinetic Modeling," Chemical Geology, vol. 265, No. 1-2, pp. 63-78; Jul. 15, 2009.

\* cited by examiner

CARBON DIOXIDE SEQUESTRATION THROUGH FORMATION OF GROUP-2 CARBONATES AND SILICON DIOXIDE

The present application claims the benefit of priority to U.S. Provisional Application No. 61/288,242 filed Dec. 18, 2009, the entire content of which is incorporated herein by reference in its entirety.

BACKGROUND OF THE INVENTION

I. Field of the Invention

The present invention generally relates to the field of removing carbon dioxide and, collaterally with that removal, other pollutants from waste streams. More particularly, the present invention relates to removing carbon dioxide and other pollutants from waste streams through the absorption of carbon dioxide and other pollutants from flue-gas-like streams. It includes the co-generation of group-2 carbonate materials.

II. Description of Related Art

Considerable domestic and international concern in both private and commercial sectors has been increasingly focused over the last four decades on emissions from industries into the air. In particular, attention has been focused on the greenhouse gases that have the property of affecting the retention of solar heat in the atmosphere, producing a "greenhouse effect." The greenhouse effect occurs when incoming heat from the sun is trapped in the atmosphere and hydrosphere of the earth, raising the average atmospheric temperature, ocean temperature, and other average temperatures of the planet, resulting in climatic change. The effect is generally agreed as an operating effect in the Earth's thermal balance, though the rates, the extent to which man's combustion of materials affects it and the extent, direction, and magnitude of the effect are debated. Despite the degree of debate, all would agree there is a benefit to removing $CO_2$ (and other chemicals) from point-emission sources if the cost for doing so were sufficiently small.

Greenhouse gases are predominately made up of carbon dioxide and are produced by municipal power plants and large-scale industry in site-power-plants, though they are also produced in any normal carbon combustion (such as automobiles, rain-forest clearing, simple burning, etc.). Since the most concentrated point-emissions typically occur at power-plants across the planet, reduction and/or removal from those fixed sites is an attractive point to effect a removal-technology. Because energy production is a primary cause of greenhouse gas emissions, methods such as reducing carbon intensity, improving efficiency, and sequestering carbon from power-plant flue-gas by various means has been researched and studied intensively over the last thirty years.

Reducing carbon intensity involves the alternate use of non-carbon energy sources such as nuclear, hydroelectric, photovoltaic, geothermal, and other sources of electric power to reduce the percentage of power produced through exclusive carbon combustion. While each of these techniques of power-generation continues to gain in terms of total energy production, the projections of world electricity demand are expected to increase at rates faster than energy production from these methods. Therefore, carbon greenhouse gas emissions are expected to increase despite growth in non-carbon energy sources.

Improving efficiency has generally focused on techniques of improving the combustion of carbon through pre-combustion, decarbonization, oxygen-fired combustion, etc. by first decreasing the amount of $CO_2$ produced and then oxidizing all potential pollutants as completely as possible. Also, the technique increases the amount of energy generated per carbon dioxide emission released for improved efficiency. While strides in this area have improved combustion efficiency, there is little more improvement to be extracted from this field of endeavor.

Attempts at sequestration of carbon (in the initial form of gaseous $CO_2$) have produced many varied techniques, which can be generally classified as geologic, terrestrial, or ocean systems. These techniques are primarily concerned with transporting generated carbon dioxide to physical sites and injecting the carbon dioxide into geologic, soil, or ocean repositories. Each of these sequestering techniques involves large costs in preparing $CO_2$ for transport, accomplishing the transport, and performing the injection into a "carbon bank." As such, these techniques are generally not economically feasible and in many cases consume more energy than the original carbon produced.

Sequestration can also include several industrial processes which include scrubbing, membranes, lower-cost $O_2$, and hydrates. However, each of these technologies suffer due to the capital plant costs raised to uneconomic levels, and the effect of $CO_2$ capture on the cost of electricity is prohibitive. The referenced shortcomings are not intended to be exhaustive, but rather are among many that tend to impair the effectiveness of previously known techniques for removing carbon dioxide from waste streams; however, those mentioned here are sufficient to demonstrate that the methodologies appearing in the art have not been altogether satisfactory and that a significant need exists for the techniques described and claimed in this disclosure.

SUMMARY OF THE INVENTION

Disclosed herein are methods and apparatuses for removing carbon dioxide sequestration, including removing carbon dioxide from waste streams. In one aspect, the present disclosure provides a method of sequestering carbon dioxide produced by a source, comprising:
  (a) obtaining a hydroxide salt in an aqueous mixture:
  (b) admixing the hydroxide salt with carbon dioxide produced by the source under conditions suitable to form a first carbonate salt in a first admixture;
  (c) chlorinating a group-2 silicate mineral with hydrochloric acid under conditions suitable to form a corresponding group-2 chloride salt, water, and silicon dioxide;
  (d) admixing the group-2 chloride salt with the first carbonate salt under conditions suitable to form a group-2 carbonate salt in a second admixture; and
  (e) separating said group-2 carbonate salt from the admixture,
whereby the carbon dioxide is sequestered into a mineral product form. In some embodiments, the method further comprises:
  (f) obtaining a second chloride salt; and
  (g) reacting the second chloride salt under chloralkali conditions to form products comprising chlorine, hydrogen and a hydroxide salt.

In some embodiments, some or all of the hydroxide salt in step (b) is obtained from step (g). In some embodiments, the method further comprises:
  (h) obtaining chlorine; and
  (i) liquefying the chlorine under photolytic conditions to form hydrogen chloride.

In some embodiments, some or all of the chlorine in step (h) is obtained from step (g). In some embodiments, some or all of the hydrogen chloride of step (i) is used to chlorinate the group-2 silicate mineral in step (c).

In some embodiments, the reaction of step (d) occurs in an electrochemical cell. In some variants thereof, step (d) further comprises:
- (d)(1) reacting the first carbonate salt with a proton source under conditions suitable to form a first bicarbonate salt; and
- (d)(2) reacting the first bicarbonate salt with the group-2 chloride salt to form the group-2 carbonate salt.

In some embodiments, the reaction of step (d)(2) further comprises the formation of a second chloride salt. In some variants thereof, some or all of the second chloride salt in step (f) is obtained from step (d)(2).

In some embodiments, the electrochemical cell generates a first source of electrical energy. In some variants thereof, the first source of electrical energy is generated with greater than 70% efficiency based on the theoretical maximum potential of the electrochemical cell. In some embodiments, some or all of the first source of energy is used to drive a part of the reaction of step (g).

In some embodiments, the method further comprises:
- (j) using some or all of the hydrogen of step (g) to generate a second source of energy.

In some variants thereof, some or all of the second source of energy is used to drive a part of the reaction of step (g).

In some embodiments, some or all of the hydroxide salt is sodium hydroxide. In some embodiments, some or all of the first carbonate salt is sodium carbonate. In some embodiments, some or all of the group-2 silicate mineral is a group-2 inosilicate. In some variants thereof, some or all of the group-2 silicate mineral is $CaSiO_3$, $MgSiO_3$ or mixtures thereof.

In some embodiments, some or all of the group-2 chloride salt is $CaCl_2$, $MgCl_2$, or mixtures thereof. In some embodiments, some or all of the group-2 carbonate salt is $CaCO_3$, $MgCO_3$ or mixtures thereof. In some embodiments, some or all of the second chloride salt is NaCl.

In some embodiments, the photolytic condition comprises radiation having a wavelength from about 200 nm to about 400 nm. For example, in some embodiments, the wavelength is about 254 nm or about 363 nm.

In some embodiments, obtaining the hydroxide of step (a) comprises:
- (a)(1) obtaining a group-1 or group-2 salt;
- (a)(2) admixing the salt with acid and water, acid and steam, or acid, water, and steam to produce a protonated brine solution; and
- (a)(3) electrolyzing the protonated brine solution to produce a hydroxide.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present disclosure. The invention may be better understood by reference to one of these drawings in combination with the detailed description of specific embodiments presented herein.

DESCRIPTION OF ILLUSTRATIVE EMBODIMENTS

Figure 1:
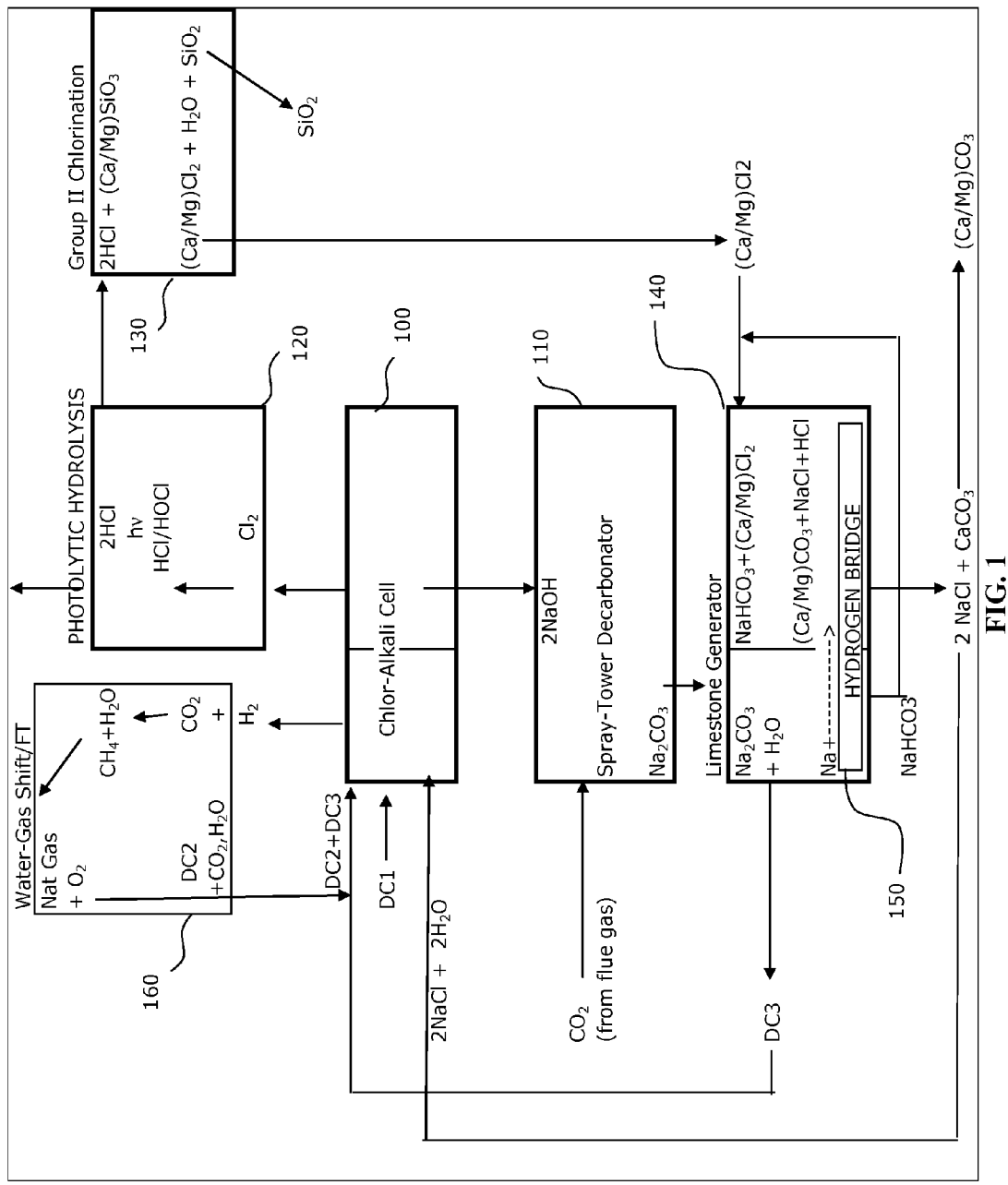
FIG. 1 is block diagram of a system according to embodiments of the present invention. DC1, DC2 and DC3 are three separate sources of electrical energy.

The present invention relates to carbon dioxide sequestration, including processes in which group-2 silicates are used to remove carbon dioxide from waste streams to form corresponding group-2 carbonates and silica. Embodiments of the methods and apparatuses of the invention comprise one or more of the following general components: (1) an aqueous decarbonation process whereby gaseous $CO_2$ is absorbed into an aqueous caustic mixture and then reacted with the hydroxide to form carbonate and/or bicarbonate products; (2) a separation process whereby the carbonate and/or bicarbonate products are separated from the liquid mixture; (3) a brine electrolysis process for production of the sodium hydroxide that is used as the absorbent fluid in the decarbonation process; (4) generation and use of by-products from the decarbonation and electrolysis processes, including chlorine gas, sodium carbonate and bicarbonate, and hydrogen gas; and (5) the direct and/or indirect conversion of group-2 silicate minerals into group-2 carbonates and silicon dioxide. Each of these general components is explained in further detail below.

While many embodiments of the present invention consume some energy to accomplish the absorption of $CO_2$ and other chemicals from flue-gas streams and to accomplish the other objectives of embodiments of the present invention as described herein, one advantage of certain embodiments of the present invention is that they provide ecologic efficiencies that are superior to those of the prior art, while absorbing most or all of the power-plant emitted $CO_2$.

Another additional benefit of certain embodiments of the present invention that distinguishes them from other $CO_2$-removal processes is that in some market conditions, the products are worth considerably more than the reactants required or the net-power or plant-depreciation costs. In other words, certain embodiments are industrial methods of producing chlor-hydro-carbonate products at a profit, while accomplishing considerable removal of $CO_2$ and incidental pollutants of concern.

I. Definitions

As used herein, the terms "carbonates" or "carbonate products" are generally defined as mineral components containing the carbonate group, $[CO_3]^{2-}$. Thus, the terms encompass both carbonate/bicarbonate mixtures and species containing solely the carbonate ion. The terms "bicarbonates" and "bicarbonate products" are generally defined as mineral components containing the bicarbonate group, $[HCO_3]^{1-}$. Thus, the terms encompass both carbonate/bicarbonate mixtures and species containing solely the bicarbonate ion.

In the formation of bicarbonates and carbonates using some embodiments of the present invention, the term "ion ratio" refers to the ratio of sodium ions in the product divided by the number of carbons present in that product. Hence, a product stream formed of pure bicarbonate ($NaHCO_3$) may be said to have an "ion ratio" of 1.0 (Na/C), whereas a product stream formed of pure carbonate ($Na_2CO_3$) may be said to have an "ion ratio" of 2.0 (Na/C). By extension, an infinite number of continuous mixtures of carbonate and bicarbonate may be said to have ion ratios varying between 1.0 and 2.0.

As used herein, the term "sequestration" is used to refer generally to techniques or practices whose partial or whole effect is to remove $CO_2$ from point emissions sources and to store that $CO_2$ in some form so as to prevent its return to the atmosphere. Use of this term does not exclude any form of the described embodiments from being considered "sequestration" techniques.

As used herein, the term "ecological efficiency" is used synonymously with the term "thermodynamic efficiency" and is defined as the amount of $CO_2$ sequestered by certain embodiments of the present invention per energy consumed (represented by the equation "$\partial CO_2/\partial E$"). $CO_2$ sequestration is denominated in terms of percent of total plant $CO_2$; energy consumption is similarly denominated in terms of total plant power consumption.

As used herein, the terms "low-voltage electrolysis" and "LVE" are used to refer to electrolysis at voltages below about 5 volts.

The pyroxenes are a group of silicate minerals found in many igneous and metamorphic rocks. They share a common structure consisting of single chains of silica tetrahedra and they crystallize in the monoclinic and orthorhombic systems. Pyroxenes have the general formula $XY(Si,Al)_2O_6$, where X represents calcium, sodium, iron (II) and magnesium and more rarely zinc, manganese and lithium and Y represents ions of smaller size, such as chromium, aluminium, iron(III), magnesium, manganese, scandium, titanium, vanadium and even iron (II).

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result.

The above definitions supersede any conflicting definition in any of the reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

II. Flow Diagram: Sequestration of Carbon Dioxide

FIG. 1 depicts a simplified process-flow diagram illustrating general, exemplary embodiments of the apparatuses and methods of the present disclosure. This diagram is offered for illustrative purposes only, and thus it merely depicts specific embodiments of the present invention and is not intended to limit the scope of the claims in any way.

In the embodiment shown in FIG. 1, the chor-alkali cell 100 uses power from three sources, external power (DC1) and recaptured power (DC2 and DC3), to drive a reaction represented by equation 1.

$$2NaCl+2H_2O \rightarrow 2NaOH+Cl_2+H_2. \tag{1}$$

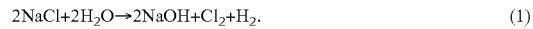

The sodium hydroxide, chlorine and hydrogen produced from this reaction are delivered to the spray-tower decarbonator 110, photolytic hydrolysis 120 and step 160, respectively.

Carbon dioxide from flue-gas enters the process at the spray-tower decarbonator 110, potentially after initially exchanging waste-heat with a waste-heat/DC generation system. Sodium hydroxide from the chloralkali cell 100 reacts with carbon dioxide in the spray-tower decarbonator 110 according to the reaction represented by equation 2.

$$2NaOH+CO_2 \rightarrow Na_2CO_3+H_2O \tag{2}$$

The water produced from this reaction is indirectly delivered back to chloralkali cell 100.

Chlorine from the chloralkali cell 100 is liquefied photolytically with water in the process at 120. The net reaction can be represented by equation 3:

$$Cl_2+2H_2O \rightarrow 2HCl+\tfrac{1}{2}O_2 \tag{3}$$

In some embodiments, this reaction or variants thereof are catalyzed by cobalt containing catalysts. See, for example, U.S. Pat. No. 4,764,286, which is specifically incorporated herein by reference in its entirety.

Group-2 metal silicates ($CaSiO_3$ and/or $MgSiO_3$) enter the process at 130. These minerals are reacted with hydrochloric acid from the photolytic hydrolysis 120 to form the corresponding group-2 metal chlorides ($CaCl_2$ and/or $MgCl_2$), water and sand. The reaction can be represented by equation 4.

$$2HCl+(Ca/Mg)SiO_3 \rightarrow (Ca/Mg)Cl_2+H_2O+SiO_2 \tag{4}$$

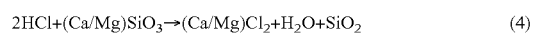

The water produced from this reaction is indirectly delivered back to chloralkali cell 100.

$(Ca/Mg)Cl_2$ from the group-2 chlorination 130 is delivered to the limestone generator 140, where it reacts indirectly with sodium carbonate from the spray-tower decarbonator 110. This reaction is mediated by hydrogen bridge 150, which connects two half-cell reactions that can be represented by equations 5 and 6.

$$Na_2CO_3+HCl \rightarrow NaHCO_3+NaCl \tag{5}$$

$$NaHCO_3+(Ca/Mg)Cl_2 \rightarrow (Ca/Mg)CO_3+HCl+NaCl \tag{6}$$

Power DC3 from the coupling of equations 5 and 6 in the form of DC current is delivered from limestone generator 140 to chloralkali cell 100. The sodium chloride produced by equations 5 and 6 is delivered to chloralkali cell 100. In this manner, the reactant required to electrolyze (NaCl) has been regenerated, and, given appropriate conditioning, is prepared to be electrolyzed and absorb another cycle of $CO_2$, thus forming a chemical loop.

The net reaction capturing the summation of equations 1-6 is shown here as equation 7:

$$CO_2+(Ca/Mg)SiO_3 \rightarrow (Ca/Mg)SiO_3+SiO_2 \tag{7}$$

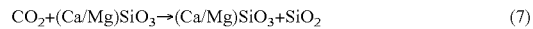

Hydrogen from chloralkali cell 100 is further reacted with carbon dioxide in step 160 to generate power (DC2), for example, in some embodiments mixing hydrogen with natural gas and burning this mixture in a turbine designed for natural gas power generation and connected to an electrical generator, or, for example, in other embodiments using water-gas shift and Fischer-Tropsch technology. DC2 is delivered in the form of DC current back to chloralkali cell 100.

Through the process shown in FIG. 1 and described herein, power can be returned directly and/or indirectly from some or even all of the hydrochloric-acid produced, while only group-2 carbonates are generated as end-sequestrant material and some or all of the sodium, chlorine and hydrogen is cycled. In so doing, the process effectively uses a lower-energy sodium-based chlorine-electrolysis pathway for the generation of the hydroxide used to capture the carbon-dioxide from its gaseous state.

These methods and devices can be further modified, optimized and scaled up using the principles and techniques of chemistry, chemical engineering, and/or materials science as applied by a person skilled in the art. Such principles and techniques are taught, for example, in U.S. Patent Application Publications 2006/0185985 and 2009/0127127, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, and International Application No. PCT/US08/77122, filed Sep. 19, 2008. The entire text of each of the above-referenced disclosures (including any appendices) is specifically incorporated by reference herein without disclaimer.

The above examples were included to demonstrate particular embodiments of the invention. However, those of skill in the art should, in light of the present disclosure, appreciate that many changes can be made in the specific embodiments which are disclosed and still obtain a like or similar result without departing from the spirit and scope of the invention.

III. Silicate Minerals for the Sequestration of Carbon Dioxide

In aspects of the present invention there are provided methods of sequestering carbon dioxide using silicate minerals. The silicate minerals make up one of the largest and most important classes of rock-forming minerals, constituting approximately 90 percent of the crust of the Earth. They are classified based on the structure of their silicate group. Silicate minerals all contain silicon and oxygen. In some aspects of the present invention, group-2 silicates may be used to accomplish the energy efficient sequestration of carbon dioxide.

In some embodiments, compositions comprising group-2 inosilicates may be used. Inosilicates, or chain silicates, have interlocking chains of silicate tetrahedra with either $SiO_3$, 1:3 ratio, for single chains or $Si_4O_{11}$, 4:11 ratio, for double chains. In some preferred embodiments, the methods disclosed herein use compositions comprising group-2 inosilicates from the pyroxene group. For example, enstatite ($MgSiO_3$) may be used.

In other preferred embodiments, compositions comprising group-2 inosilicates from the pyroxenoid group are used. For example, wollastonite ($CaSiO_3$) may be used. In further embodiments, compositions comprising mixtures of group-2 inosilicates may be employed, for example, mixtures of enstatite and wollastonite. In yet other embodiments compositions comprising mixed-metal group-2 inosilicates may be used, for example, diopside ($CaMgSi_2O_6$).

Wollastonite usually occurs as a common constituent of a thermally metamorphosed impure limestone. Typically wollastonite results from the following reaction (equation 8) between calcite and silica with the loss of carbon dioxide:

$$CaCO_3 + SiO_2 \rightarrow CaSiO_3 + CO_2 \quad (8)$$

In some embodiments, the present invention has the result of effectively reversing this natural process. Wollastonite may also be produced in a diffusion reaction in skarn. It develops when limestone within a sandstone is metamorphosed by a dyke, which results in the formation of wollastonite in the sandstone as a result of outward migration of calcium ions.

In some embodiments, the purity of the group-2 inosilicate compositions may vary. For example, it is contemplated that the group-2 inosilicate compositions used in the disclosed processes may contain varying amounts of other compounds or minerals, including non-group-2 metal ions. For example, wollastonite may itself contain small amounts of iron, magnesium, and manganese substituting for calcium.

IV. Limestone Generation and Uses

In aspects of the present invention there are provided methods of sequestering carbon dioxide in the form of limestone. Limestone is a sedimentary rock composed largely of the mineral calcite (calcium carbonate: $CaCO_3$). This mineral has many uses, some of which are identified below.

Limestone in powder or pulverized form, as formed in some embodiments of the present invention, may be used as a soil conditioner (agricultural lime) to neutralize acidic soil conditions, thereby, for example, neutralizing the effects of acid rain in ecosystems. Upstream applications include using limestone as a reagent in desulfurizations.

Limestone is an important stone for masonry and architecture. One of its advantages is that it is relatively easy to cut into blocks or more elaborate carving. It is also long-lasting and stands up well to exposure. Limestone is a key ingredient of quicklime, mortar, cement, and concrete.

Calcium carbonate is also used as an additive for paper, plastics, paint, tiles, and other materials as both white pigment and an inexpensive filler.

Purified forms of calcium carbonate may be used in toothpaste, added to bread and cereals as a source of calcium. $CaCO_3$ is also commonly used medicinally as an antacid.

Currently, the majority of calcium carbonate used in industry is extracted by mining or quarrying. By co-generating this mineral as part of carbon dioxide sequestration in some embodiments, this invention provides a non-extractive source of this important product.

V. Magnesium Carbonate Generation and Uses

In aspects of the present invention there are provided methods of sequestering carbon dioxide in the form of magnesium carbonate. Magnesium carbonate, $MgCO_3$, is a white solid that occurs in nature as a mineral. The most common magnesium carbonate forms are the anhydrous salt called magnesite ($MgCO_3$) and the di, tri, and pentahydrates known as barringtonite ($MgCO_3 \cdot 2H_2O$), nesquehonite ($MgCO_3 \cdot 3H_2O$), and lansfordite ($MgCO_3 \cdot 5H_2O$), respectively. Magnesium carbonate has a variety of uses; some of these are briefly discussed below.

Magnesium carbonate may be used to produce magnesium metal and basic refractory bricks. $MgCO_3$ is also used in flooring, fireproofing, fire extinguishing compositions, cosmetics, dusting powder, and toothpaste. Other applications are as filler material, smoke suppressant in plastics, a reinforcing agent in neoprene rubber, a drying agent, a laxative, and for color retention in foods. In addition, high purity magnesium carbonate is used as antacid and as an additive in table salt to keep it free flowing.

Currently magnesium carbonate is typically obtained by mining the mineral magnesite. By co-generating this mineral as part of carbon dioxide sequestration in some embodiments, this invention provides a non-extractive source of this important product.

VI. Silicon Dioxide Generation and Uses

In aspects of the present invention there are provided methods of sequestering carbon dioxide that produce silicon dioxide as a byproduct. Silicon dioxide, also known as silica, is an oxide of silicon with a chemical formula of $SiO_2$ and is known for its hardness. Silica is most commonly found in nature as sand or quartz, as well as in the cell walls of diatoms. Silica is the most abundant mineral in the Earth's crust. This compound has many uses; some of these are briefly discussed below.

Silica is used primarily in the production of window glass, drinking glasses and bottled beverages. The majority of optical fibers for telecommunications are also made from silica. It is a primary raw material for many whiteware ceramics such as earthenware, stoneware and porcelain, as well as industrial Portland cement.

Silica is a common additive in the production of foods, where it is used primarily as a flow agent in powdered foods, or to absorb water in hygroscopic applications. It is the primary component of diatomaceous earth which has many uses ranging from filtration to insect control. It is also the primary component of rice husk ash which is used, for example, in filtration and cement manufacturing.

Thin films of silica grown on silicon wafers via thermal oxidation methods can be quite beneficial in microelectronics, where they act as electric insulators with high chemical stability. In electrical applications, it can protect the silicon, store charge, block current, and even act as a controlled pathway to limit current flow.

In hydrated form, silica is used in toothpaste as a hard abrasive to remove tooth plaque.

Silica is typically manufactured in several forms including glass, crystal, gel, aerogel, fumed silica, and colloidal silica. By co-generating this mineral as part of carbon dioxide sequestration in some embodiments, this invention provides another source of this important product.

VII. Aqueous Decarbonation (Absorption) of $CO_2$ from Waste Streams and its Conversion into Carbonate and Bicarbonate As noted above, in certain embodiments, the apparatuses and methods of the present disclosure employ an aqueous decarbonation process whereby gaseous $CO_2$ is absorbed into an aqueous caustic mixture where it then reacts with the hydroxide to form carbonate and bicarbonate products. In many embodiments of the present invention, sodium hydroxide is used as the primary absorbent fluid. Sodium hydroxide, in various concentrations, is known as a ready absorber of $CO_2$. When carbon dioxide is brought into contact with aqueous sodium hydroxide, a continuum of products that range from pure sodium bicarbonate ($NaHCO_3$) to pure sodium carbonate ($Na_2CO_3$) can be formed, and differing conditions can be produced that will drive the equilibrium either direction. In some embodiments of the present invention, most or nearly all of the carbon dioxide is reacted in this manner. In some embodiments, the reaction may proceed to completion (or its near vicinity) and sufficient concentration of the desired carbonate product may be achieved (by either process chemistry or removal of water by various means) in order to cause precipitation of bicarbonate, carbonate, or a mixture of both.

Figure 2:
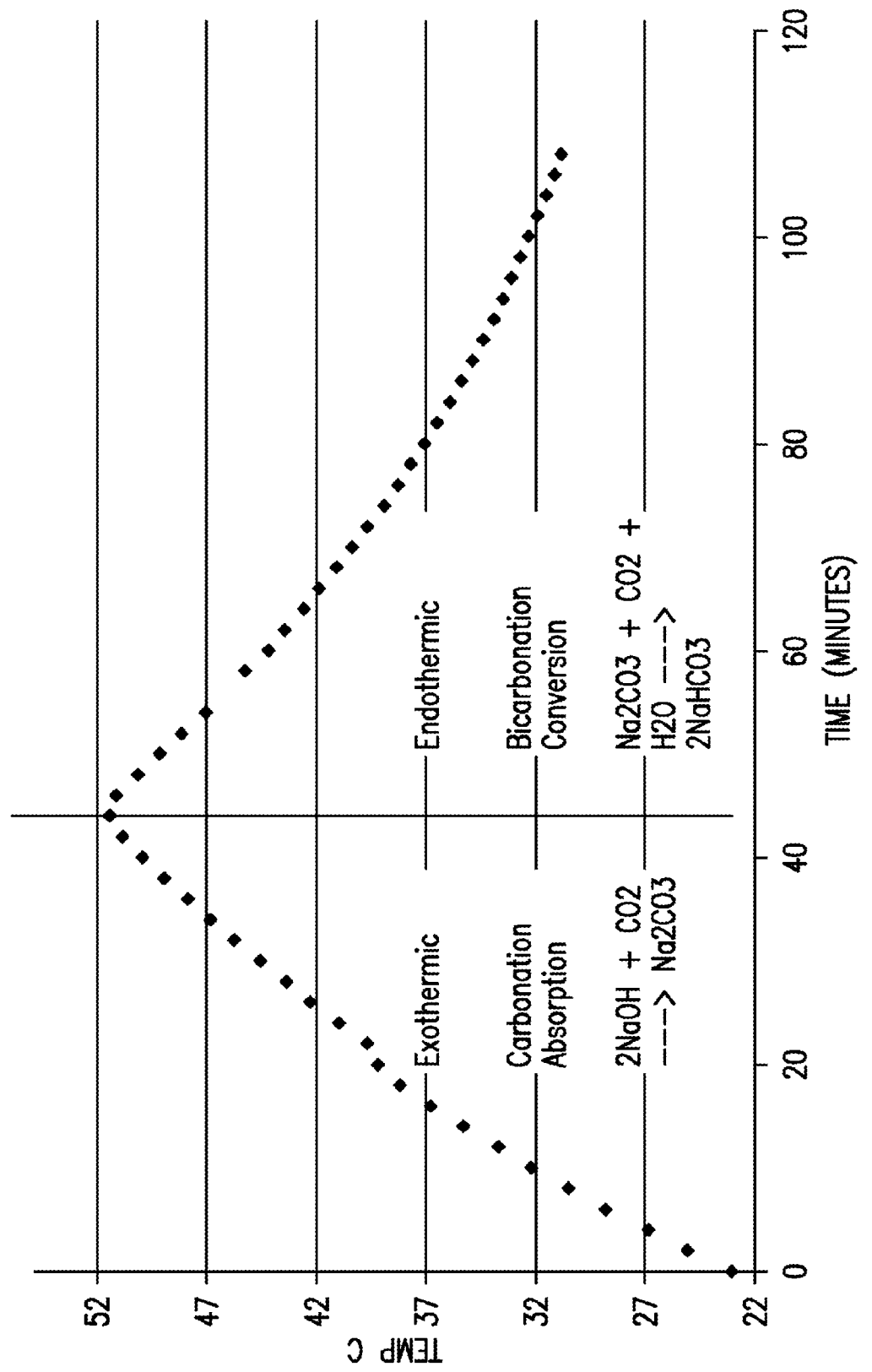
FIG. 2 is a chart showing the thermal behavior approximated by fluid within a reaction chamber as the reaction proceeds for the time indicated.

In some embodiments, when carbon dioxide is brought into contact with aqueous sodium hydroxide, the fluid within the reaction chamber approximates the behavior shown in FIG. 2 as the reaction proceeds for the time indicated. The two temperature-excursion phases correspond and identify two distinct reaction regimes:

1. An initial absorption phase in which $CO_2$ is readily absorbed. The absorption ability of the fluid declines as the $OH^-$ concentration declines, and absorption ends and in some instances reverses when the $OH^-$ concentration is consumed. The reaction is exothermic during this portion and forms almost exclusively carbonate.
2. A secondary conversion phase in which $CO_2$ is not-readily absorbed. The passage of the flue-gas through the mixture does not cause any net $CO_2$ absorption by the fluid, but the fluid is significantly cooled by loss of heats of vaporization due to any evaporation of water, by any loss of $CO_2$ to the vapor state, and by any endothermic reactions taking place. During this phase, sodium carbonate already formed in solution is converted to sodium bicarbonate, by the following required net stoichiometry:

$$Na_2CO_3(aq)+H_2O(l)+CO_2(aq)\rightarrow 2NaHCO_3(aq) \qquad (9)$$

The two phases are distinguished by the characteristics shown in Table 1 below.

TABLE 1

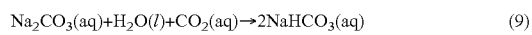

Thermodynamics and Products During $CO_2$ Absorption.

| Phase | Thermo-dynamics | Product | $CO_2$ Absorption | [OH] Presence |
|---|---|---|---|---|
| Carbonation | Exothermic | $Na_2CO_3$ | Robust | Plentiful |
| Bicarbonation | Endothermic | $NaHCO_3$ | Reduces, Nil or negative | De minimis |

In various embodiments of the present invention, all forms of the bicarbonate/carbonate concentration spectrum may be produced. In preferred embodiments, the concentrations, temperatures, pressures, flow-rates, etc. of the fluids can be manipulated to optimize the proportion of "available" $CO_2$ absorbed to optimize the formation of sodium carbonate. For example, it has been demonstrated that pure carbonate ($Na_2CO_3$) may be produced in solution at conditions that absorb 70% of incoming $CO_2$ in a single-stage bubble-column gas-liquid contactor with a depth of 0.30 m fluid depth/gas-liquid contact distance. Without being bound by theory, by extrapolating to a 90% absorption, less than two meters of contact distance should therefore sufficient to absorb 90% of incoming $CO_2$. See, e.g., U.S. Patent Application Publication 2009/0127127, which is specifically incorporated by reference herein without disclaimer.

These methods and devices can be further modified, optimized and scaled up using the principles and techniques of chemistry, chemical engineering, and/or materials science as applied by a person skilled in the art. Such principles and techniques are taught, for example, in U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235, 482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, and International Application No. PCT/US08/77122, filed Sep. 19, 2008. The entire text of each of the above-referenced disclosures (including any appendices) is specifically incorporated by reference herein without disclaimer.

VIII. Separation of Products

As noted above, in certain embodiments, the apparatuses and methods of the present disclosure employ a separation process by which the carbonate and bicarbonate products are separated from the liquid solution. Separation of liquid solution products requires an involved process. The formation of sodium hydrogen carbonate (NaHCO$_3$ or sodium bicarbonate) and sodium carbonate (Na$_2$CO$_3$ or soda ash) in a liquid equilibrium with sodium hydroxide (NaOH or caustic soda) occurs over a wide range of temperatures and pressures and provides different end-points of the equilibrium given different partial pressures of CO$_2$. By manipulating the basic concentration, temperature, pressure, reactor size, fluid depth, and degree of carbonation, precipitates of carbonate and bicarbonate may be caused to occur. Alternatively, carbonate/bicarbonate products may be separated from their water by the exchange of heat energy with incoming flue-gases, in some preferred embodiments. Further, due to the solubility product constant differences between sodium carbonate and sodium bicarbonate, certain non-intuitive processing points can be reached; e.g., one of the peculiarities of the equilibria of carbonates of sodium in certain caustic solutions is that the addition of heat encourages precipitation of solid; also, at certain conditions, carbonates have been demonstrated to self-precipitate from the aqueous solution at high (93%+) purity.

Alternatively, in certain embodiments the heat for the separation process may be derived from the hydrogen produced in the original electrolysis or from uses of the waste-heat contained in the incoming flue-gas stream. The crystallization process inherently purifies the crystallizing mineral through the well-known process of purification by crystallization.

The exit liquid streams, depending upon reactor design, may include water, NaOH, NaHCO$_3$, Na$_2$CO$_3$, and other dissolved gases in various equilibria. Dissolved trace emission components such as H$_2$SO$_4$, HNO$_3$, and Hg may also be found. In one embodiment, to separate/remove the exiting liquid streams, e.g., removing/separating the water from the carbonates (in this sense of the word, "carbonates" means mixtures of carbonate and bicarbonate, potentially with hydroxides present as well; any separation technique applied to any such mixture would likely include adding heat energy to evaporate water from the mixture), the water may be boiled causing the water to be evaporated using a reboiler. Alternatively, retaining a partial basic solution (e.g., NaOH at approximately 1 molal) and subsequently heating the solution in a separating chamber may cause the relatively pure Na$_2$CO$_3$ to precipitate into a holding tank and the remaining NaOH to recirculate back to the reactor. In other embodiments, pure carbonate, pure bicarbonate, and mixtures of the two in equilibrium concentrations and/or in a slurry or concentrated form may then be periodically transported to a truck/tank-car. In other embodiments, the liquid streams may be displaced to evaporation tanks/fields, where the liquid, such as water, may be carried off by evaporation.

The release of gaseous products includes a concern whether NaOH or components of same can be released safely, i.e., emitting "basic rain" from a power-plant is equally to be avoided as emitting "acid rain." However, sodium hydroxide is normally used as a scrubbing element in power-plant production and is approved for use by the EPA. The handling of sodium hydroxide in power plants as well as the procedures to avoid basic release is well-known in the art. For example, a simple and inexpensive condenser/reflux unit may prevent any significant emission of NaOH in gaseous exhaust.

In a carbonate separation precipitation method according to certain embodiments of the present invention, the carbonate equilibrium sterically binds carbon-dioxide and absorbs the gas on contact, with a substantially instantaneous conversion to carbonate ion. The reaction chain may be mass-transport limited such that once the carbon-dioxide has been absorbed by the base, the subsequent ionic reactions occur at rapid pace.

The sodium carbonate equilibrium has a characteristic where as temperature is raised, Na$_2$CO$_3$ naturally precipitates and collects, which makes it amenable to be withdrawn as a slurry, with some fractional NaOH drawn off in the slurry.

IX. Electrolysis for the Production of Absorbent Fluid at Low Energies

As noted above, in certain embodiments, the apparatuses and methods of the present disclosure employ brine electrolysis for production of the sodium hydroxide that is used as the absorbent fluid in the decarbonation process. Brine electrolysis is an electrochemical process primarily used in the production of concentrated sodium hydroxide (caustic soda) and chlorine gas, and is typically described throughout the relevant literature by equation 10:

$$2NaCl+2H_2O+e^- \rightarrow 2NaOH+H_2(g)+Cl_2(g) \qquad (10)$$

Brine electrolysis is typically accomplished by three general types of standard electrolysis cells: diaphragm, mercury, and membrane cells. Each of these types of cells produces the same output products from the same input reactants. They differ from each other primarily in the way the reactants and products are separated from each other.

In one embodiment, a membrane cell may be used due to several factors. First, environmental concerns over mercury have reduced the demand for the mercury cell. Second, the diaphragm cells may produce a relatively weak caustic product which contains significant concentrations of salt and chloride ion and requires considerable subsequent reprocessing/separation to remove the significant salt content from the caustic. Third, improvements in fluorinated polymer technology have increased the life-time and electrical efficiency of membrane cell technology, where lifetimes in excess of five years are routinely guaranteed in the industrial markets. Further, the power-per-ton-of-caustic efficiencies exceeds those of both diaphragm and mercury cells in preferred implementations.

Many preferred embodiments may employ membrane cells in this function. Membrane cells have several advantages over other brine-electrolysis processes. First, membrane cells neither contain nor produce any environmentally sensitive emissions (e.g., mercury) and are electrically efficient when compared with diaphragm and mercury cells. They also employ a concentrated/dilute/make-up NaCl loop such that they may be well-suited for use as a continuous "salt loop" processing unit. Next, NaOH produced in membrane cells without further evaporation/concentration may be a naturally appropriate level of concentration for use in a decarbonation process (e.g., 30-33% NaOH by weight). Further, hydrogen produced by membrane cells is "clean," approximately "electronic grade," and relatively clear of NaCl or other contamination. As such, hydrogen may be compressed and tanked off as electronic-grade H$_2$ gas, used for power-production on-site such as combustion mix with low-grade coal or for combustion-technology gains. Alternatively, the hydrogen may be used for a boiler fuel for the separation processes, which may occur after decarbonation. Membrane cell technology may also be easily scaled from laboratory to plant-size production by the addition of small incremental units. Additionally, chlorine gas produced by the membrane process is less "wet" than that produced by other standard electrolytic processes. As such, a one-stage compression cycle may be sufficient for production of water-treatment grade chlorine.

These methods and devices can be further modified, optimized and scaled up using the principles and techniques of chemistry, chemical engineering, and/or materials science as applied by a person skilled in the art. Such principles and techniques, including techniques for using low-voltage electrolysis (LVE) to improve the thermodynamic efficiency of the process, are taught, for example, in U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, and International Application No. PCT/US08/77122, filed Sep. 19, 2008. The entire text of each of the above-referenced disclosures (including any appendices) is specifically incorporated by reference herein without disclaimer.

X. Recovery of Waste-Heat

Because certain embodiments of the present invention are employed in the presence of a power-plant or large emission of $CO_2$ in the form of flue-gas or other hot gases from combustion, there is ample opportunity to utilize this 'waste' heat in the optimization of the electro-chemical cell, unlike standard chlor-alkali processes. For instance, a typical incoming flue-gas temperature (after electro-static precipitation treatment, for instance) might well be 300° C. Heat exchangers can lower that flue-gas to a point less than 300° C., while warming the anolyte and catholyte fluids (which, for LVE, should generally be retained >90° C.) allows some embodiments of the present invention to operate without the power-losses associated with anolyte and catholyte heaters.

Generally, since the flue-gas that is available at power-plant exits at temperatures between 100° C. (scrubbed typical), 300° C. (after precipitation processing), and 900° C. (precipitation entrance), or other such temperatures, considerable waste-heat processing can be extracted by cooling the incoming flue-gas through heat-exchange with a power-recovery cycle, of which an example is an ammonia-water cycle ("Kalina" cycle, for example), a steam cycle, or any such cycle that accomplishes the same thermodynamic means. Since some embodiments of the present invention rely upon DC power to accomplish the manufacture of the reagent/absorbent for the present invention, the process can be directly powered, partially or wholly, by waste-heat recovery that is accomplished without the normal transformer losses associated with converting that DC power to AC power for other uses. Further, through the use of waste-heat-to-work engines, significant efficiencies can be accomplished without an electricity generation step being employed at all. In some conditions, these waste-heat recovery energy quantities may be found to entirely power embodiments of the present invention.

XI. Generation and Use of By-Products from the Decarbonation and Electrolysis Processes As noted above, some embodiments of the apparatuses and methods of the present disclosure produce a number of useful by-products from the decarbonation and electrolysis processes, including chlorine gas, sodium carbonate, and hydrogen gas. In some embodiments, the hydrogen gas produced by the embodiments of the present invention is incorporated into a hydrogen energy recapture loop. In some embodiments, the present invention may include current fluorinated polymer membrane technologies to reduce chlorine-ion migration for the decarbonation process. The process may therefore function without extensive energy and cost expenditure to separate out the chlorine ion; the decarbonation and separation loops are relatively chloride-free.

A. Hydrogen Energy Recapture Loop

Several techniques may used recapture energy from the hydrogen generated by embodiments of the present invention. For example, the hydrogen may be co-burned with coal to improve coal-fired emissions. Another technique involves employing a hydrogen/oxygen fuel cell for the generation of DC electricity. Yet another technique involves the burning of hydrogen in a turbine connected to an electrical generator. Still another technique involves the mixing of hydrogen with natural gas and burning this mixture in a turbine designed for natural gas power generation and connected to an electrical generator. Any of these techniques may be used alone or in combination, in some cases, together with other techniques not specifically mentioned.

In one embodiment, commercial fuel-cell production of DC electricity may be advantageous due to the easy-to-handle and safe operations at sub-atmospheric pressures. Immediate consumption of the produced hydrogen may also directly reduce the electrical load cost for the brine electrolysis. Further, since the hydrogen-energy recovery cycle may be produced with off-peak electrical production, $H_2$ may be subsequently used to provide electricity during on-peak loads, the present disclosure provides for making reactants at low-cost while subsequently producing auxiliary high-cost on-peak electricity and simultaneously performing a decarbonation process. The economic utility of an $H_2$ energy recovery cycle to increase the peak power production of a plant by augmenting the current production with $H_2$ combustion capacity as either fuel or in a fuel cell may provide for the utility of a self-consumption basis.

B. Use of Chlorine for the Chlorination of Group-2 Silicates

In some embodiments the chlorine gas may be liquefied to hydrochloric acid that is then used to chlorinate group-2 silicate minerals. The group-2 chlorides may be subsequently reacted in an ion exchange reactions with sodium carbonate. See equations 3-7 above.

Liquefaction of chlorine and subsequent use of the hydrochloric acid is particularly attractive especially in situations where the chlorine market is saturated. Liquefaction of chlorine may be accomplished according to equation 11:

$$Cl_2(g)+2H_2O(l)+hv(363nm) \rightarrow 2HCl(l)+\tfrac{1}{2}O_2(g) \qquad (11)$$

In some embodiments, the oxygen so-produced may be returned to the air-inlet of the power-plant itself, where it has been demonstrated throughout the course of power-industry investigations that enriched oxygen-inlet plants have (a) higher carnot-efficiencies, (b) more concentrated $CO_2$ exit streams, (c) lower heat-exchange to warm inlet air, and (d) other advantages over non-oxygen-enhanced plants. In other embodiments, the oxygen may be utilized in a hydrogen/oxygen fuel cell. In further embodiments, the oxygen may serve as part of the oxidant in a turbine designed for natural gas power generation, for example, using a mixture of mixing of hydrogen and natural gas.

XII. Removal of Other Pollutants from Source

In addition to removing $CO_2$ from the source, in some embodiments of the invention, the decarbonation conditions will also remove $SO_X$ and $NO_X$, and, to a lesser extent, mercury. Tests using $SO_X$/Ar and $NO_X$/Ar in charged-load single-stage decarbonators have demonstrated 99%+removal of these components of flue-gas (by "99%+," it is meant that the presence of either pollutant in a 14 L/min flue-gas processing case was not detectable in the product air-stream by gas-chromatograph technique, i.e., they were effectively removed). In certain embodiments of the present invention, the incidental scrubbing of $NO_X$, $SO_X$, and mercury compounds can assume greater economic importance; i.e., by employing embodiments of the present invention, coals that contain large amounts of these compounds can be combusted in the power plant with, in some embodiments, less resulting pollution than with higher-grade coals processed without the benefit of the $CO_2$/absorption process of certain embodiments of the present invention.

All of the methods disclosed and claimed herein can be made and executed without undue experimentation in light of the present disclosure. While the compositions and methods of this invention have been described in terms of particular embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of sequestering carbon dioxide produced by a source, comprising:
   (a) obtaining a hydroxide salt in an aqueous mixture:
   (b) admixing the hydroxide salt with carbon dioxide produced by the source under conditions suitable to form a first carbonate salt in a first admixture;
   (c) chlorinating a group-2 silicate mineral with hydrochloric acid under conditions suitable to form a corresponding group-2 chloride salt, water, and silicon dioxide;
   (d) admixing the group-2 chloride salt with the first carbonate salt under conditions suitable to form a group-2 carbonate salt in a second admixture; and
   (e) separating said group-2 carbonate salt from the admixture,
   wherein the reaction of step (d) occurs in an electrochemical cell which generates a first source of electrical energy, and whereby the carbon dioxide is sequestered into a mineral product form.

2. The method of claim 1, further comprising:
   (f) obtaining a second chloride salt; and
   (g) reacting the second chloride salt under chloralkali conditions to form products comprising chlorine, hydrogen and a hydroxide salt.

3. The method of claim 2, where some or all of the hydroxide salt in step (b) is obtained from step (g).

4. The method of claim 2, further comprising:
   (h) obtaining chlorine; and
   (i) liquefying the chlorine under photolytic conditions to form hydrogen chloride.

5. The method of claim 4, where some or all of the chlorine in step (h) is obtained from step (g).

6. The method of claim 4, where some or all of the hydrogen chloride of step (i) is used to chlorinate the group-2 silicate mineral in step (c).

7. The method of claim 1, where step (d) further comprises:
   (d)(1) reacting the first carbonate salt with a proton source under conditions suitable to form a first bicarbonate salt; and
   (d)(2) reacting the first bicarbonate salt with the group-2 chloride salt to form the group-2 carbonate salt.

8. The method of claim 7, where the reaction of step (d)(2) further comprises the formation of a second chloride salt.

9. The method of claim 8, where some or all of the second chloride salt in step (f) is obtained from step (d)(2).

10. The method of claim 1, where the first source of electrical energy is generated with greater than 70% efficiency based on the theoretical maximum potential of the electrochemical cell.

11. The method of claim 1, where some or all of the first source of energy is used to drive a part of the reaction of step (g).

12. The method of claim 2, further comprising:
    (j) using some or all of the hydrogen of step (g) to generate a second source of energy.

13. The method of claim 12, where some or all of the second source of energy is used to drive a part of the reaction of step (g).

14. The method of claim 1, where some or all of the hydroxide salt is sodium hydroxide.

15. The method of claim 1, where some or all of the first carbonate salt is sodium carbonate.

16. The method of claim 1, where some or all of the group-2 silicate mineral is a group-2 inosilicate.

17. The method of claim 1, where some or all of the group-2 silicate mineral is $CaSiO_3$.

18. The method of claim 1, where some or all of the group-2 silicate mineral is $MgSiO_3$.

19. The method of claim 1, where some or all of the group-2 chloride salt is $CaCl_2$.

20. The method of claim 1, where some or all of the group-2 chloride salt is $MgCl_2$.

21. The method of claim 1, where some or all of the group-2 carbonate salt is $CaCO_3$.

22. The method of claim 1, where some or all of the group-2 carbonate salt is $MgCO_3$.

23. The method of claim 2, where some or all of the second chloride salt is NaCl.

24. The method of claim 4, where the photolytic condition comprises radiation having a wavelength from about 200 nm to about 400 nm.

25. The method of claim 24, where the wavelength is about 254 nm.

26. The method of claim 24, where the wavelength is about 363 nm.

27. The method of claim 1, where obtaining the hydroxide comprises:
    (a)(1) obtaining a group-1 or group-2 salt;
    (a)(2) admixing the salt with acid and water, acid and steam, or acid, water, and steam to produce a protonated brine solution; and
    (a)(3) electrolyzing the protonated brine solution to produce a hydroxide.

* * * * *